United States Patent
Strickland, III

(10) Patent No.: US 9,475,659 B2
(45) Date of Patent: Oct. 25, 2016

(54) APPARATUS FOR HANDING AND MOVING A STACK OF TIRES

(71) Applicant: David Strickland, III, Birmingham, AL (US)

(72) Inventor: David Strickland, III, Birmingham, AL (US)

( * ) Notice: Subject to any disclaimer, the term of this patent is extended or adjusted under 35 U.S.C. 154(b) by 0 days.

(21) Appl. No.: 14/230,699

(22) Filed: Mar. 31, 2014

(65) Prior Publication Data

US 2014/0294552 A1 Oct. 2, 2014

Related U.S. Application Data

(60) Provisional application No. 61/806,714, filed on Mar. 29, 2013.

(51) Int. Cl.
*B65G 7/08* (2006.01)
*B65G 59/08* (2006.01)

(52) U.S. Cl.
CPC ....... *B65G 59/08* (2013.01); *B65G 2201/0273* (2013.01)

(58) Field of Classification Search
CPC .......... B65G 59/08; B65G 2201/0273; B65G 57/28; B65G 65/23; B65G 7/00; B65G 7/02; B65G 7/04; B65G 7/06; B65G 7/08; B65H 15/00; B65H 15/02

USPC .......... 414/778, 789.3, 782, 795.8
See application file for complete search history.

(56) References Cited

U.S. PATENT DOCUMENTS

| | | | | |
|---|---|---|---|---|
| 2,776,831 | A * | 1/1957 | Shields | 414/788.5 |
| 3,883,007 | A * | 5/1975 | Hirschboeck | 414/782 |
| 4,338,055 | A * | 7/1982 | Petersson | 414/788 |
| 4,708,583 | A * | 11/1987 | Moen | 414/802 |
| 5,681,141 | A * | 10/1997 | Critel | 414/789.2 |
| 5,788,461 | A * | 8/1998 | Easton et al. | 414/796.2 |
| 6,050,771 | A * | 4/2000 | Dykstra | 414/795.8 |
| 2003/0210978 | A1* | 11/2003 | Smets et al. | 414/798.9 |
| 2007/0065268 | A1* | 3/2007 | Clapp | 414/773 |
| 2012/0074084 | A1* | 3/2012 | Barber et al. | 211/85.8 |

FOREIGN PATENT DOCUMENTS

| | | | | |
|---|---|---|---|---|
| DE | 1920645 | A1 * | 3/1970 | B65G 65/23 |
| EP | 2008955 | A1 * | 12/2008 | B65G 57/28 |

* cited by examiner

*Primary Examiner* — Gabriela Puig
(74) *Attorney, Agent, or Firm* — Wayne Edward Ramage; Baker Donelson

(57) ABSTRACT

A rotary apparatus or machine that takes or receives a barrel stack of mounted tires in the vertical position (i.e., barrel stacked), and rotates the stack as a whole to a horizontal position, where each unit or tire is an upright position. The tires can then be rolled off individually or in multiple units to be installed on the equipment being built, or transported from the tire holding area to the assembly floor or installation area.

12 Claims, 11 Drawing Sheets

APPARATUS FOR HANDING AND MOVING A STACK OF TIRES

This application claims benefit of and priority to U.S. Provisional Application No. 61/806,714, filed Mar. 29, 2013, by David Strickland, and is entitled to that filing date for priority. The specification, figures and complete disclosure of U.S. Provisional Application No. 61/806,714 are incorporated herein by specific reference for all purposes.

FIELD OF INVENTION

This invention relates to a machine and apparatus for handling and moving a stack of mounted tires at a receiving facility.

BACKGROUND OF THE INVENTION

When tires that are mounted on wheel-rims are shipped from the tire supplier to the equipment builder or similar facility for use, they typically are stacked vertically, lying flat on top of each other. This is generally referred to as "barrel stacking." The barrel stacks may be shipped on a pallet or without a pallet. This is the most efficient use of space, and minimizes the cost of shipping as well as the space required at the equipment builder or receiving facility to store the tires.

However, the barrel stack presents problems in reaching and removing units of one or more tires from the top of the stack for use, and lifting the units from a flat position to an upright position for moving and installation. The present invention addresses these problems.

SUMMARY OF THE INVENTION

In several embodiments, the present invention comprises a rotary apparatus or machine that takes or receives a barrel stack of mounted tires in the vertical position (i.e., barrel stacked), and rotates the stack as a whole to a horizontal position, where each unit or tire is an upright position. The tires can then be rolled off individually or in multiple units to be installed on the equipment being built, or transported from the tire holding area to the assembly floor or installation area.

DETAILED DESCRIPTION OF EXEMPLARY EMBODIMENTS

In several embodiments, the present invention comprises a rotary apparatus or machine 2 that takes or receives a barrel stack of mounted tires 4 in the vertical position (i.e., barrel stacked), and rotates the stack as a whole to a horizontal position, where each unit or tire is an upright position. The tires can then be rolled off individually or in multiple units to be installed on the equipment being built, or transported from the tire holding area to the assembly floor or installation area.

Figure 1:
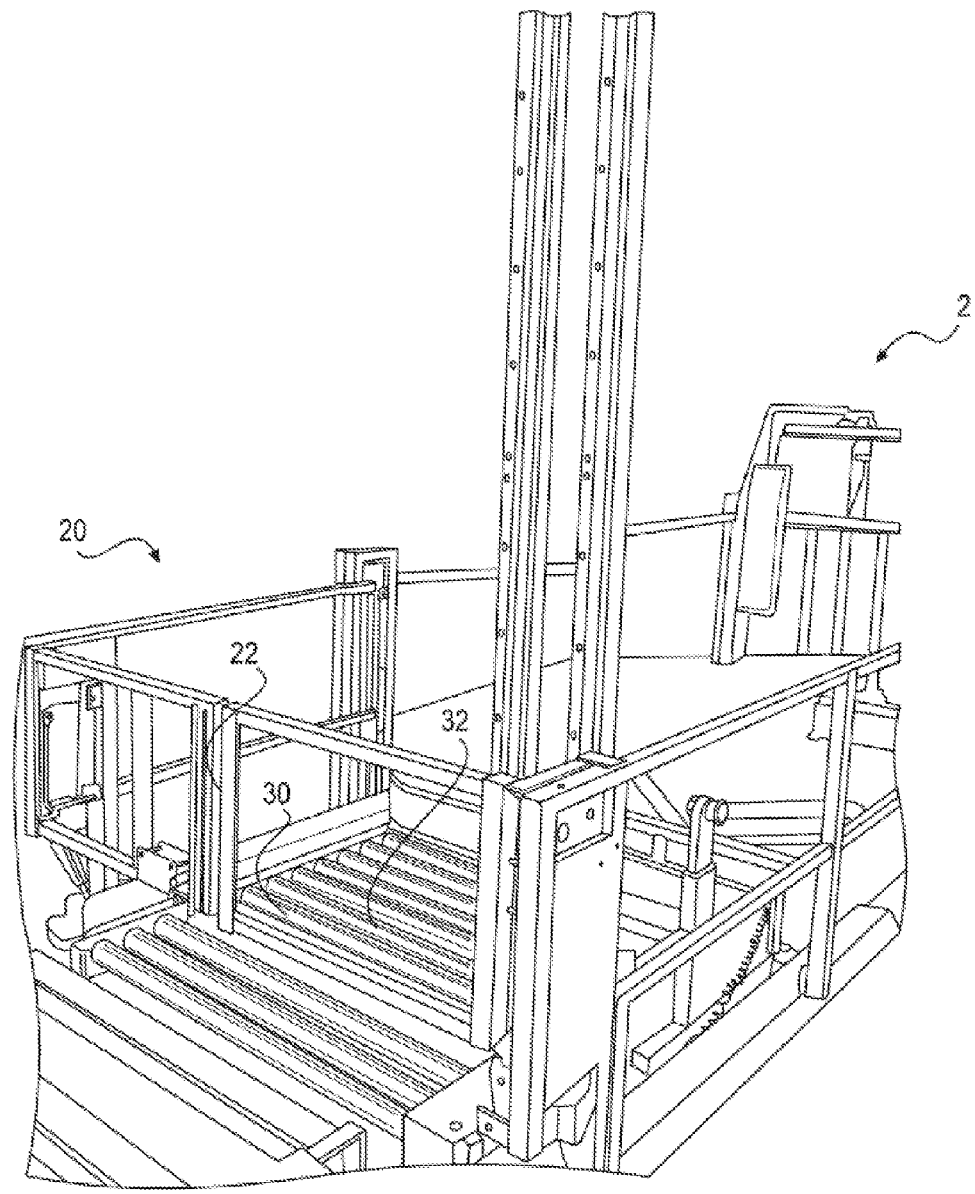
FIGS. 1-2 show the rotary apparatus in a loading position.
Figure 2:
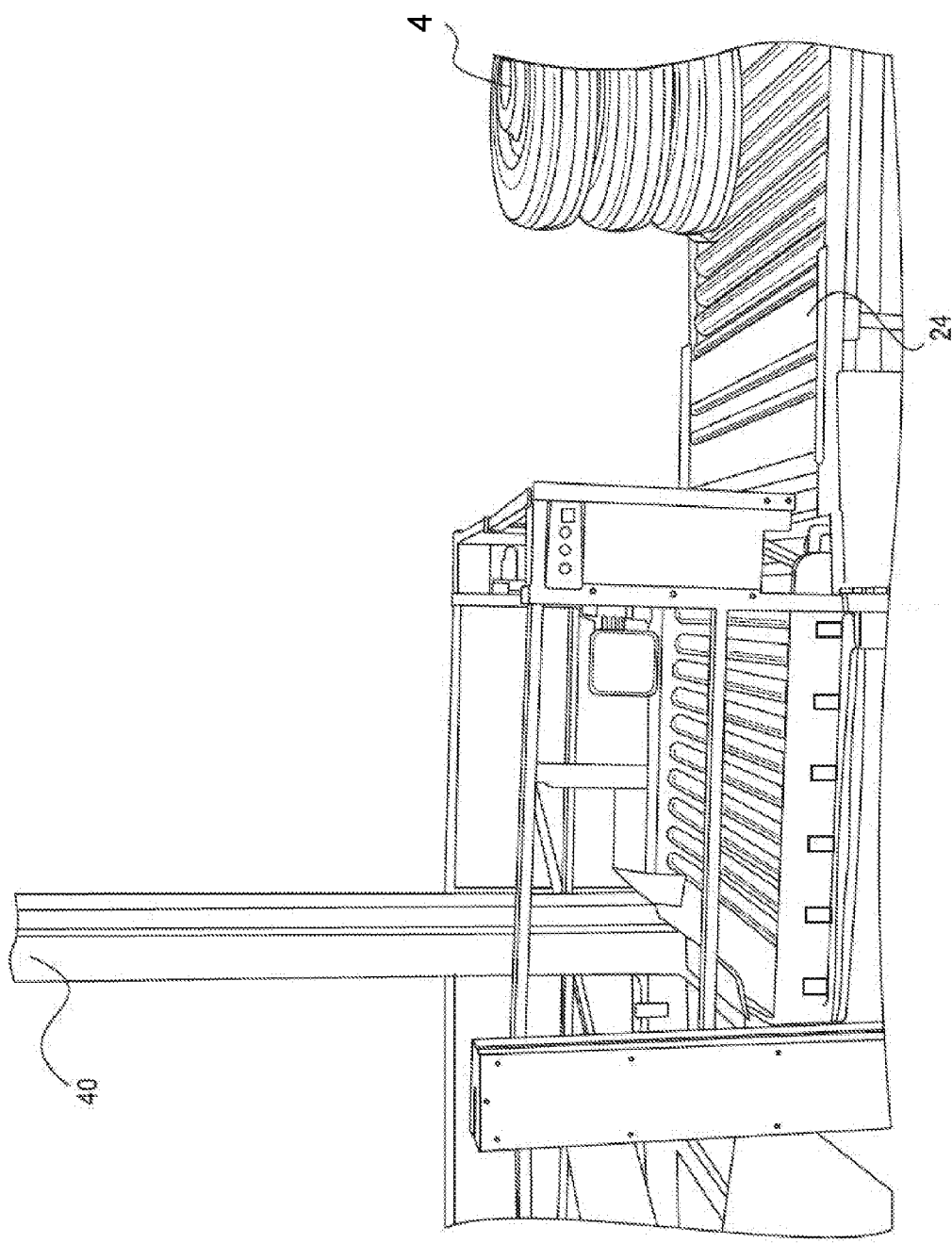
Figure 3:
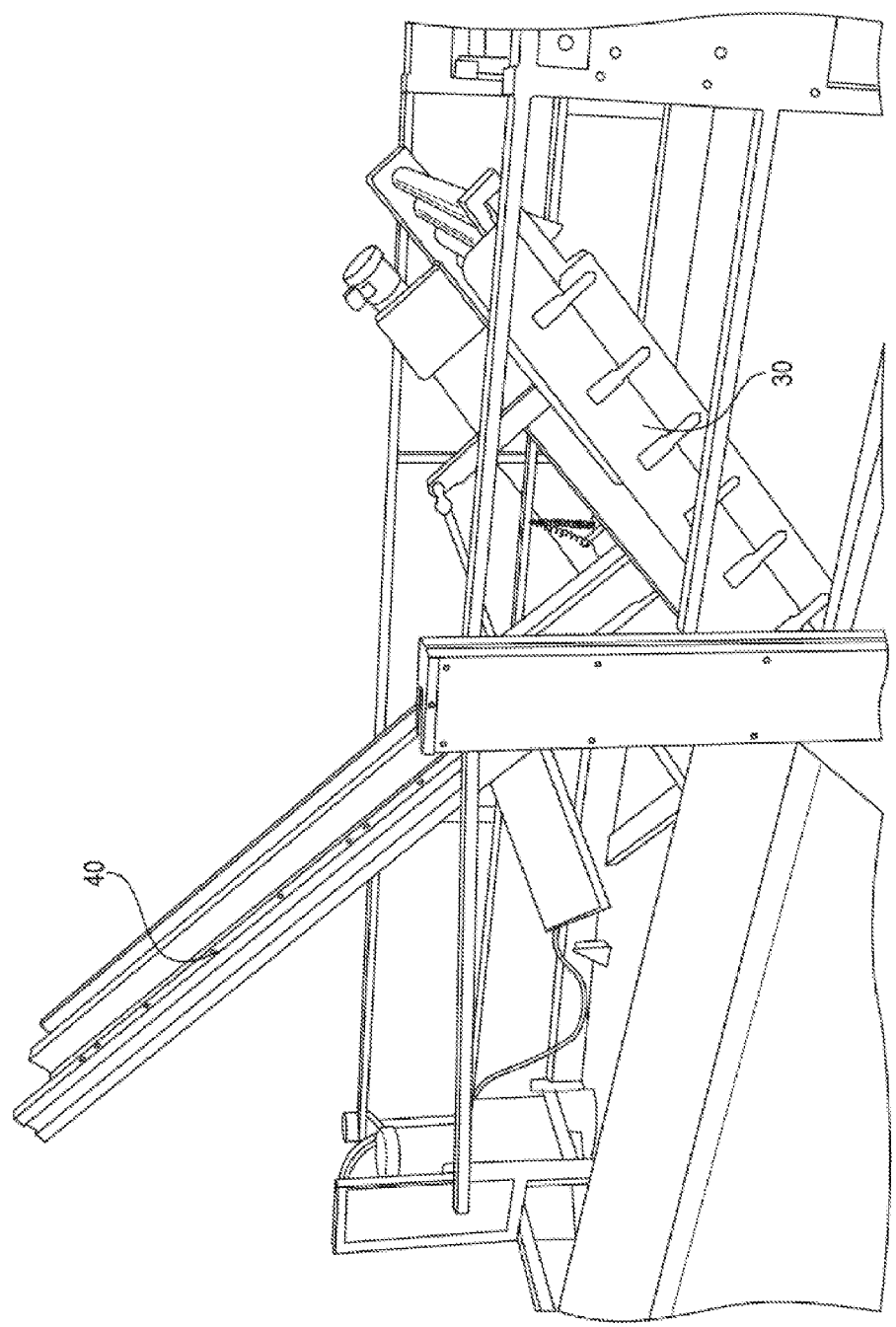
FIGS. 3-4 show the rotary apparatus midway between a loading position and an off-loading position.
Figure 4:
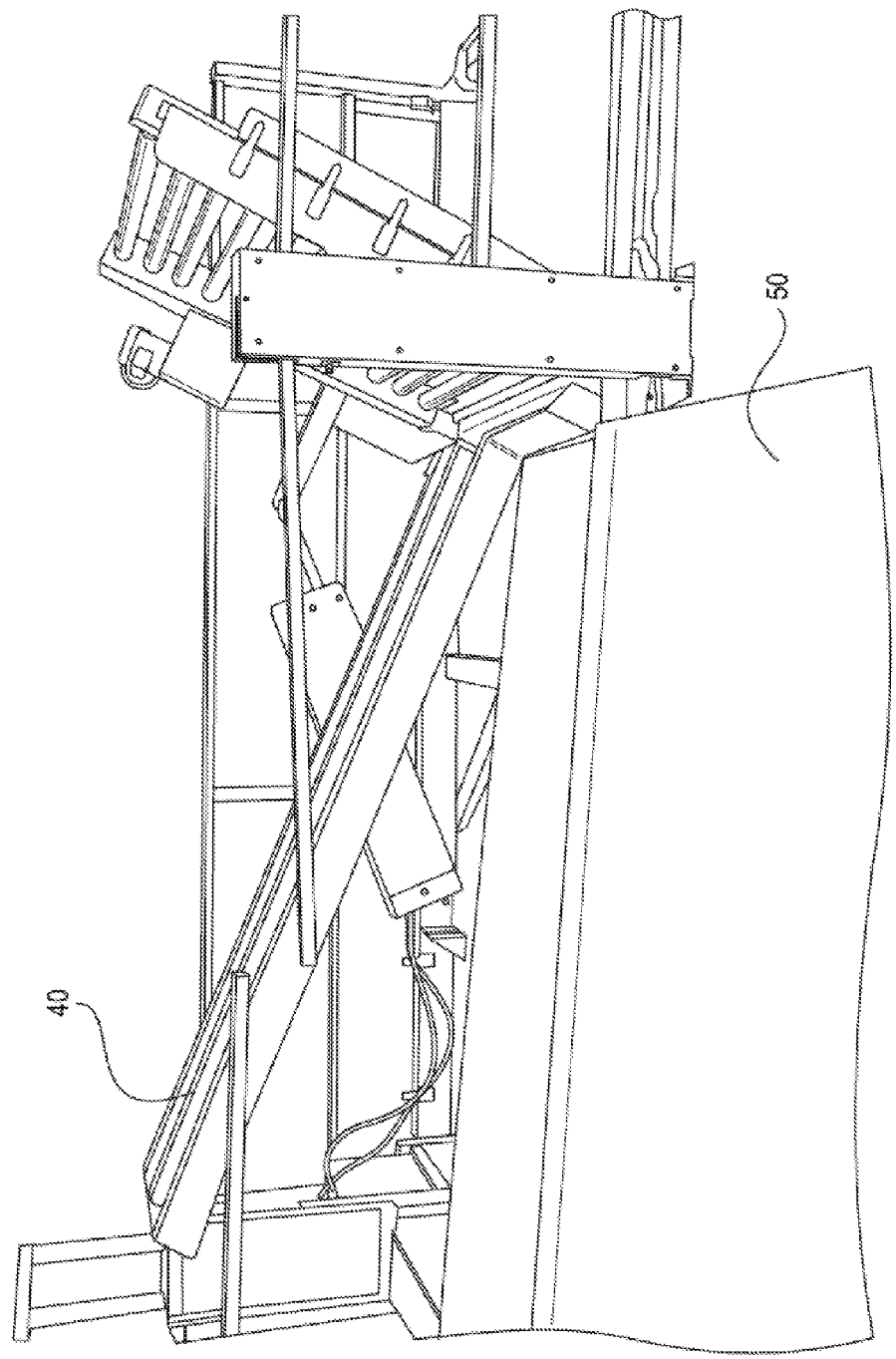
Figure 5:
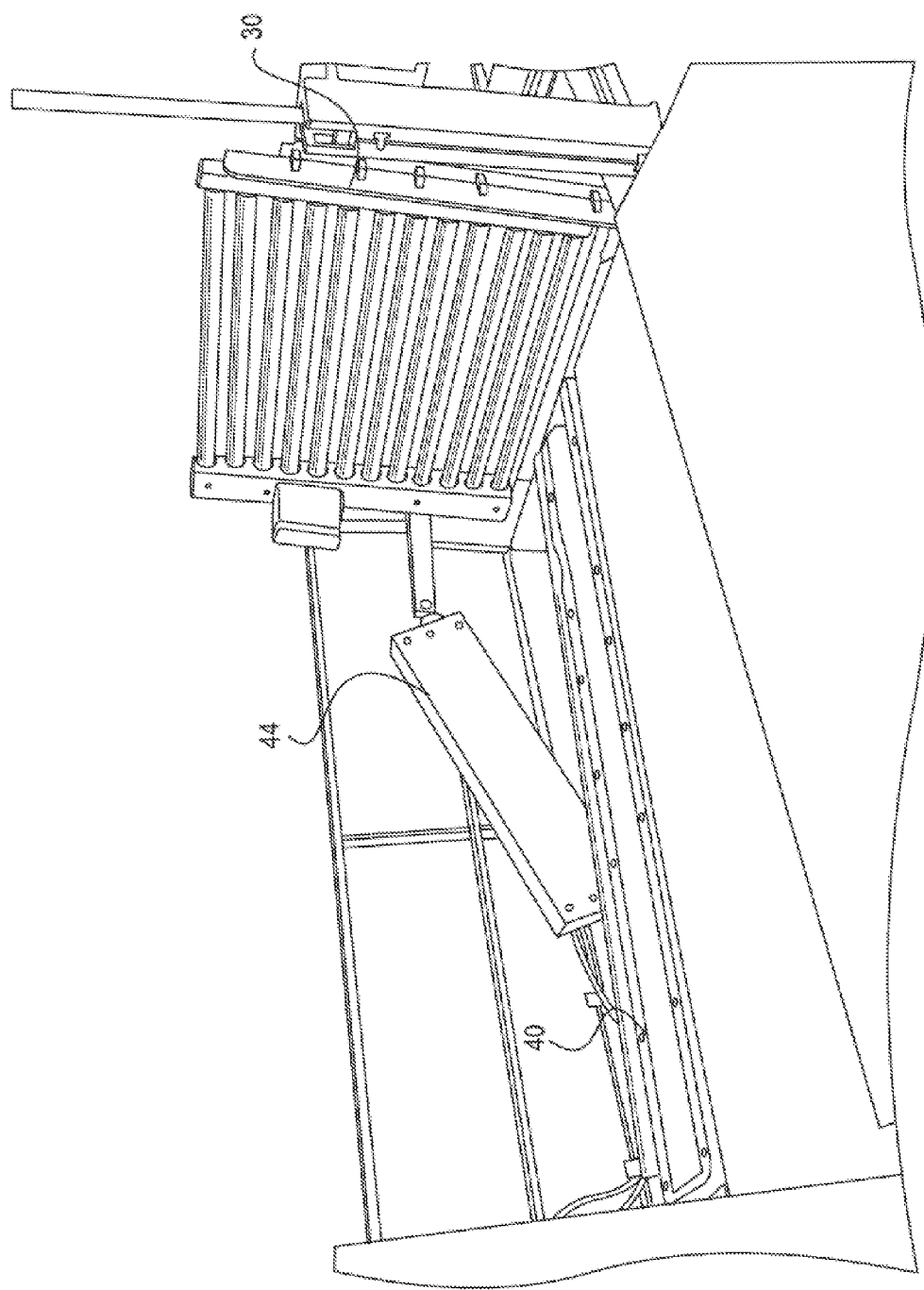
FIGS. 5-6 show the rotary apparatus in an off-loading position.

FIGS. 1 and 2 show the apparatus in a loading position ready to receive a barrel stack of tires. In the embodiment shown, the apparatus comprises a receiving area 20 for receiving a barrel stack of tires, which may or may not be placed on a pallet. The receiving area comprises a railing along two sides, with a security gate 22 along a third side. The security gate, when open, allows access to the receiving floor 30, which may or may not contain rollers 32 to help the barrel stack of tires 4 roll up the receiving ramp 24 and onto the receiving floor 30.

A tire support beam 40 is attached to one side of the receiving floor 30. The tire support beam and receiving floor pivot together, as seen in FIGS. 1-5, so that the support beam 40 moves from a vertical position (i.e., a loading position) to a horizontal, or approximately horizontal position, while the receiving floor 30 simultaneously moves from a flat position to a raised, tilted or vertical position. In the latter position (i.e., the off-loading position), the tire support beam 40 is generally flush with the top end of the off-loading ramp 50. While the support beam can be moved to a true horizontal position, in the embodiment shown, the tire support beam in the off-loading position is not fully horizontal (i.e., at a slight angle upward, with the top of the support beam being somewhat higher in elevation than the bottom of the support beam where attached to the receiving floor). This angle assists in keeping tires in place when off-loading.

Movement of the tire support beam and receiving floor is achieved by one or more piston mechanisms 44. The piston may be controlled by a control device on the apparatus, or remotely, or both.

The tire support beam 40 may be unitary, or, as seen in FIGS. 1-5, comprise two component beam with a gap 42 in the middle. The gap helps hold the tires in place when the device is moved to the off-loading position. In one embodiment, the inside edges of one or both components beams are beveled to help secure the tires in place, while assisting in rolling the tires off the tire support beam when off-loading.

Figure 6:
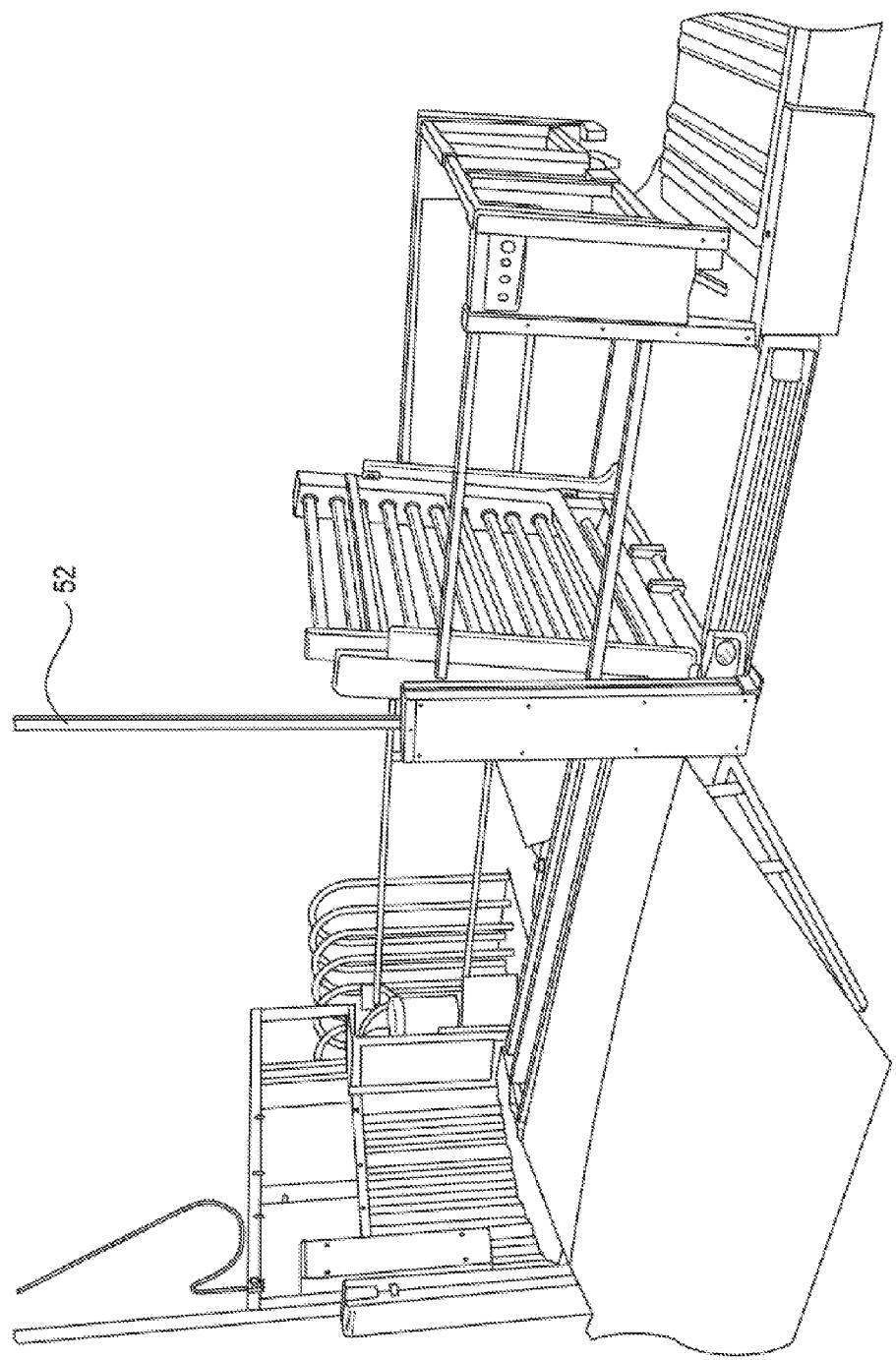

In the embodiment shown, the pivot point is along the side of the receiving floor where the support beam is attached, and the receiving cage railings and security gate remain in place. In one embodiment, the security gate 22 opens only when the receiving floor is in a flat position (as seen in FIG. 1), and is closed and cannot be opened when the receiving floor and tire support beam are being moved, or the receiving floor is in a raised position, as seen in FIG. 6.

Similarly, one or more security arms 52 may be placed across the front of the apparatus at or near the top of the off-loading ramp 50. These security arms may be lowered to prevent access to the offloading area when the device is in operation, or in some instances, when the device is in the loading position.

Figure 7:
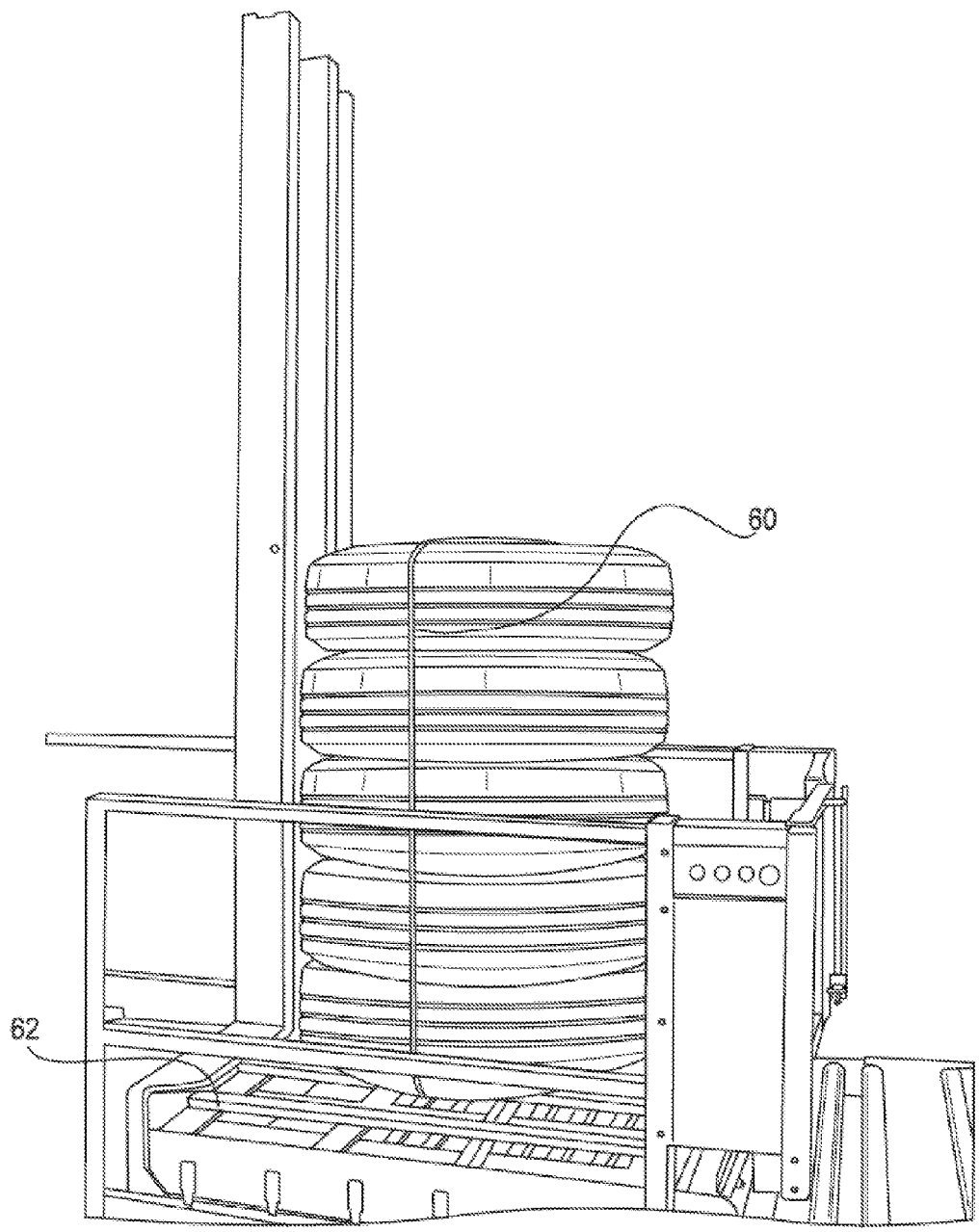
FIG. 7 shows barrel stacked tires on a pallet loaded on the rotary apparatus.
Figure 8:
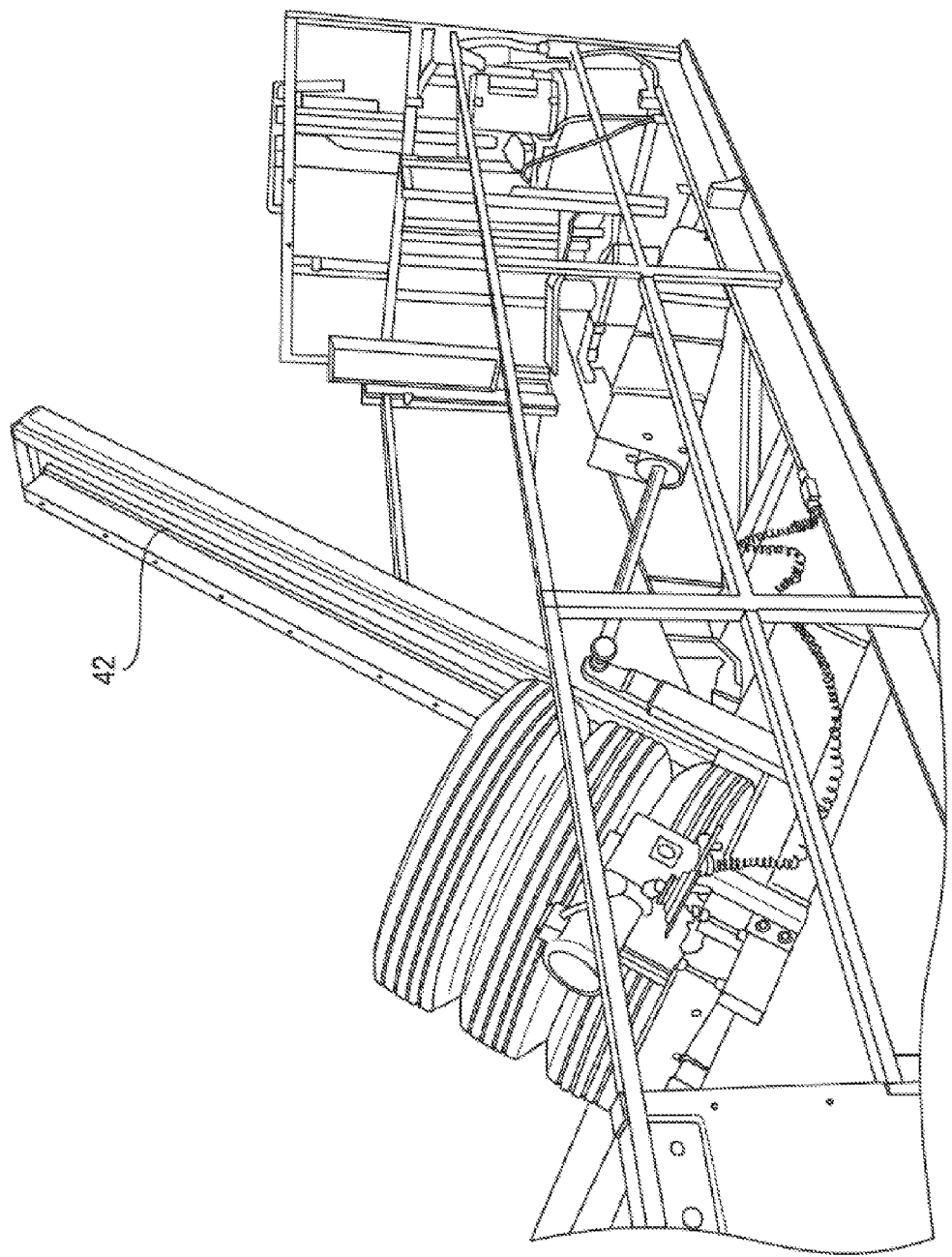
FIG. 8 shows the rotary apparatus with tires midway between a loading position and an off-loading position.
Figure 9:
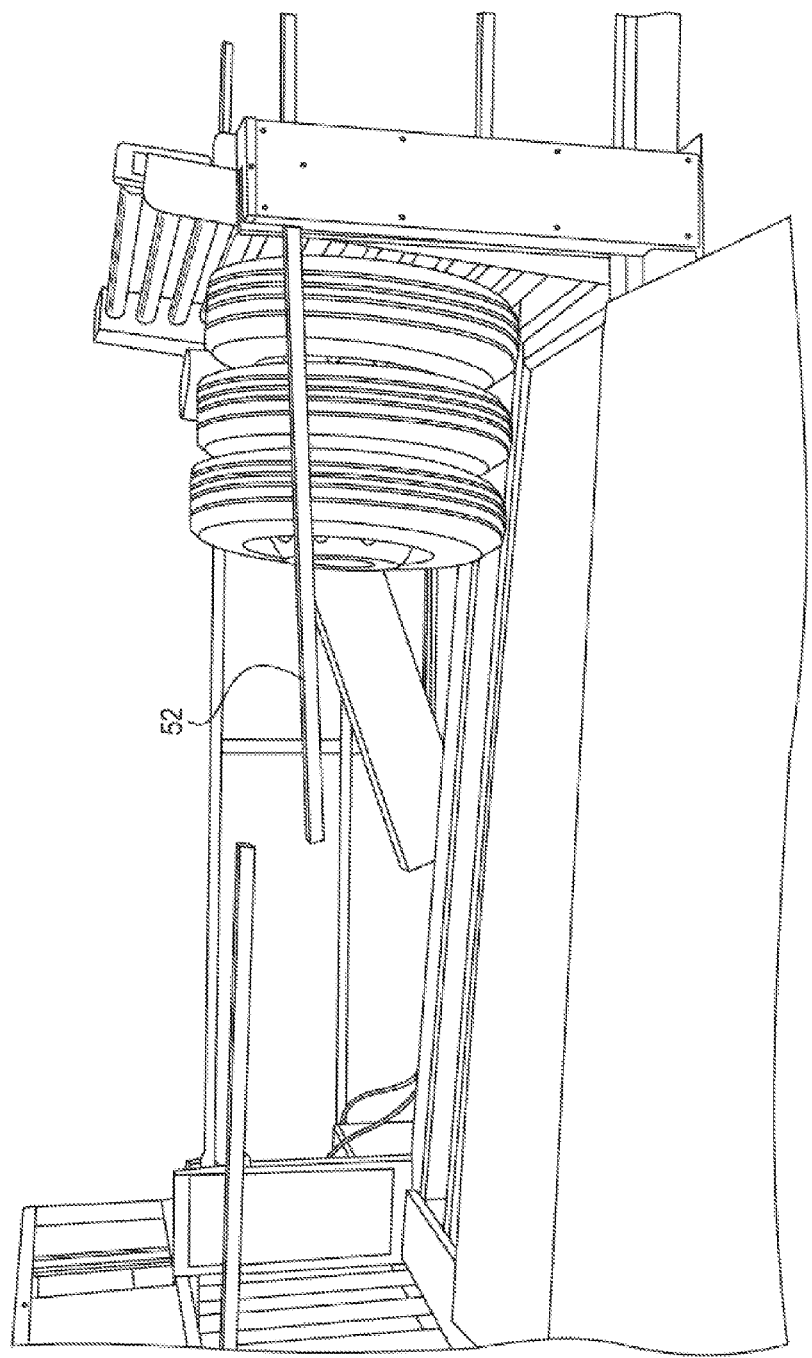
FIG. 9-10 show the rotary apparatus with tires in an off-loading position.
Figure 10:
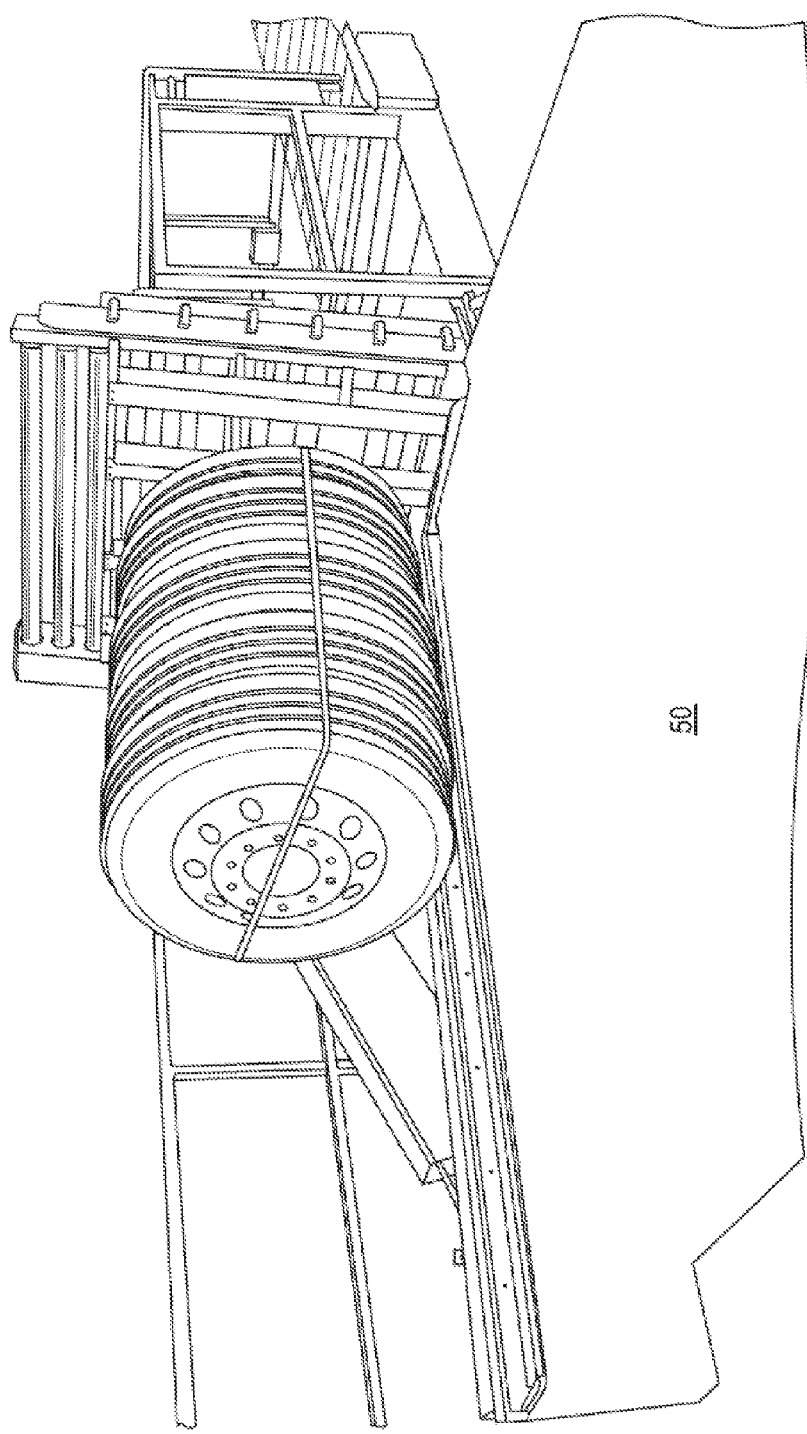

FIGS. 7-9 show the same apparatus with tires in place. FIG. 7 shows a barrel stack of tires with a security tie 60 on a pallet 62 already loaded on the apparatus, which is in a loading position. A stack of tires can moved without a security tie FIGS. 8-10 show the tires being moved to the off-loading position.

When in the off-loading position, tires can then be rolled off the stack and down the off-loading ramp 50 individually or in groups as needed. The device itself may be mobile, and moved close to the assembly floor or installation area (i.e., where the tires are installed). The device also may be relative immobile and fixed in place. In the latter case, the barrel tires moved to the assembly floor or installation area by other means.

A barrel stack may be transported to and placed in the rotary machine by a variety of means known in the art, including a forklift. The barrel stack may be secured by a tie, as seen in FIG. 7, or may be unsecured.

Figure 11:
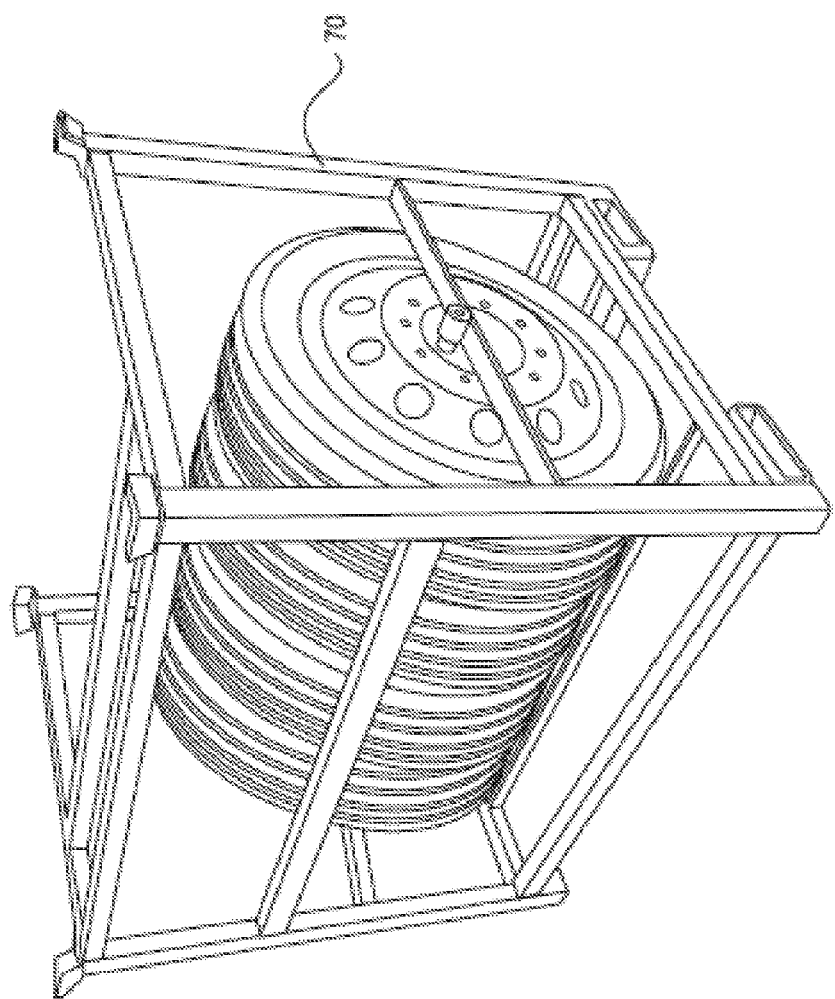
FIG. 11 show a tire cage or rack for use with the rotary apparatus.

In a further exemplary embodiment, as seen in FIG. 11, a mobile or movable tire cage or rack 70 may be used in conjunction with the rotary apparatus described above. The cage may be wheeled or not wheeled. The cage is placed on or rolled onto the rotary machine, typically in a horizontal position (i.e., the off-loading position for tires), and then rotated to a vertical position (i.e., the loading position for tires). The barrel stack of tires is then placed or loaded in the cage on the machine, and the machine rotates the cage back to a horizontal position. The cage can then be removed from the machine and moved (such as by a forklift or similar means) or rolled from the tire holding area to the assembly floor or installation area, and tires rolled off individually or in multiple units from the cage, to be installed on the equipment being built as needed. A plurality of cages may thus be used with the rotary machine to handle multiple barrel stacks.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A machine, comprising:
   a tire support beam with a first end and a second end and a longitudinal slot extending between the first and second end; and
   a tire receiving floor connected to the first end of the tire support beam, wherein the tire receiving floor is substantially orthogonal to the tire support beam;
   wherein the tire support beam and tire receiving floor are adapted to move a stack of two or more tires from a vertical alignment to a horizontal alignment by pivotably rotating around the first end of the tire support beam from a loading position to an off-loading position, wherein the tire support beam is substantially vertical in the loading position, and substantially horizontal or near-horizontal in the off-loading position, from which off-loading position said tires may be removed from said stack in a direction perpendicular to the tire support beam; and
   further wherein the second end is free to swing from the loading position to the off-loading position.

2. The machine of claim 1, wherein the tire receiving floor is substantially horizontal in the loading position, and substantially vertical or near-vertical in the off-loading position.

3. The machine of claim 1, further wherein the tire receiving floor is contained in a railed tire loading area.

4. The machine of claim 3, further comprising a security gate allow access to the tire loading area.

5. The machine of claim 1, further comprising one or more pistons for moving the tire support beam and tire receiving floor.

6. The machine of claim 1, wherein the tire receiving floor comprises a plurality of rollers.

7. The machine of claim 1, wherein the tire support beam comprises a pair of parallel beams with a gap therebetween.

8. The machine of claim 1, further comprising an off-loading ramp with a top and bottom.

9. The machine of claim 8, wherein the tire support beam is substantially flush with the top of the off-loading ramp when the tire support beam is in the off-loading position.

10. The machine of claim 8, further comprising one or more movable security arms extending across the off-loading ramp at or near the top of the off-loading ramp.

11. The machine of claim 1, further comprising a tire cage for holding a plurality of tires.

12. The machine of claim 11, wherein the tire cage is movable.

* * * * *